United States Patent
Schmatz et al.

(10) Patent No.: US 8,093,910 B2
(45) Date of Patent: Jan. 10, 2012

(54) CROSS-TALK PROCESSING IN SERIAL LINK BUSES

(75) Inventors: Martin Leo Schmatz, Rueschlikon (CH); Thomas H. Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 12/397,815

(22) Filed: Mar. 4, 2009

(65) Prior Publication Data
US 2010/0226241 A1 Sep. 9, 2010

(51) Int. Cl.
*G01R 27/28* (2006.01)
(52) U.S. Cl. .................................................. 324/628
(58) Field of Classification Search .................. 324/628, 324/627, 612, 600, 555, 76.11; 702/1, 57, 702/85, 108, 127; 340/538.12, 12.34
See application file for complete search history.

(56) References Cited

U.S. PATENT DOCUMENTS

| | | | | |
|---|---|---|---|---|
| 5,428,687 A * | 6/1995 | Willcocks et al. | | 381/18 |
| 5,812,594 A * | 9/1998 | Rakib | | 375/219 |
| 7,239,213 B2 * | 7/2007 | Dreps et al. | | 333/1 |
| 7,327,358 B2 * | 2/2008 | Tajiri et al. | | 345/208 |
| 7,477,068 B2 * | 1/2009 | Truong et al. | | 326/27 |
| 7,477,704 B1 * | 1/2009 | Cornelius | | 375/316 |
| 7,520,585 B2 * | 4/2009 | Nagashima | | 347/17 |

* cited by examiner

*Primary Examiner* — Hoai-An D Nguyen
(74) *Attorney, Agent, or Firm* — Scully, Scott, Murphy & Presser, P.C.; Daniel P. Morris, Esq.

(57) ABSTRACT

A system and method for cross talk compensation in serial link busses, the method including: evaluating if a positive potential or a negative potential is being received by a receiver of a victim from an aggressor is dominant; measuring the distance between an incident signal and a decision threshold to obtain a positive or negative value; and using the positive or negative sign as a recovered bit value if positive potential or a negative potential is being received by a receiver of a victim from an aggressor is not dominant and using the sign of the positive potential or a negative potential that is being received by a receiver of a victim from an aggressor if this is dominant.

20 Claims, 5 Drawing Sheets

With X-talk (4 agressors)
$V_{eye, HSSCDR}$ = 65mV

Without X-talk
$V_{eye, HSSCDR}$ = 133mV

CROSS-TALK PROCESSING IN SERIAL LINK BUSES

BACKGROUND OF THE INVENTION

1. Field of the Invention

The present invention relates generally to high speed electrical communication links, and more particularly to reducing cross talk between electrical channels in serial link buses in personal computers, servers, switches and routers.

2. Description of the Related Art

A typical data communication link used in, for example, a computer includes one or more electrical data buses which may connect a first chip with a second chip. The electrical bus may be routed over solder balls, plated through holes normally referred to as vias, and conductive paths configured as transmission lines such as microstrips or strip lines, all of which affect the electrical performance of the communication link.

An important element in the performance of the communication link is the amount of cross talk which is present. Cross talk is the undesired coupling of signal energy from one conducting path (aggressor path) to another conducting path (victim path). This coupling is due to the physical proximity of the various conducting parts, specifically the microstrips or strip lines, the vias and/or wires inside of connectors. More particularly, cross talk between a circuit on a printed circuit board on one of the lines in the bus and a circuit on a down stream printed circuit board on another line in the bus is detrimental to the quality of the received signals. Usually this cross talk increases with frequency and thus limits the maximum achievable bit rate on the bus.

Point to point serial link busses are becoming the way to connect VLSI chips, e.g., microprocessors, memory buffers, bridge chips, switches, etc., amongst each other and to the rest of a system. Examples are FDB1 and FDB2, Intel QuickPath, AMD Hyper Transport, IBM Eleastic Interface etc. These interconnect solutions are characterized by combining individual serial links to a serial link bus and adding a forwarded clock signal to this bus.

As the data rate of these links reach multi-Gbps data rates, the intersymbol interference caused by dispersion (band limited) electrical channel and the timing jitter are no longer the only source of eye closure. In addition to these issues, the cross talk between electrical channels becomes a major issue, in particular in the case of single ended signaling.

Known solutions to cross talk suppression or equalization are Multiple Input, Multiple Output (MIMO) links. These links are very complicated to implement and do not fit the power/area envelop of serial link busses. Another solution averages Cross decision Feedback Equalization (CFE) where the contributions of the cross talk terms are determined from detected bits in the aggressor lanes (the cross talk source) and the derived voltage is subtracted from the input of the victim lane (the cross talk recipient). This solution has severe timing limitations. Another solution is based on predistortion in the transmitter, where the cross talk terms that are incident to the receiver are already subtracted from the victim lane in the transmitter. However, this significantly reduces the signal swing of the victim lane due to limited maximum signal swing provide by the available power supply. Other measures used to reduce cross talk include differential signaling which involves the use of two adjacent interconnects to transmit one signal, ground shields, increasing the physical separation between adjacent conductors, passive and active cross talk compensation and the like. Cross talk compensation general refers to any structure, device, or circuit which introduces energy coupling between interconnects of opposite polarity to partially cancel out the undesired cross talk. Cross cancellation is normally done in close proximity to the location where the cross talk occurs such as in a connector or on a chip, or it may be at a location along the communication link.

SUMMARY OF THE INVENTION

Cross talk between electrical channels is minimized by determining or estimating the cross talk terms based on an analysis of the bits received in the aggressor lanes. Rather than subtracting the determined estimated value from the victim lane, the victim lane determines only that noise from the cross talk is significantly reducing the eye opening, e.g., by measuring the distance between the detected signal and the decision threshold. If the receiver determines that the eye opening is small due to cross talk induced noise, it uses the signal from the cross talk overhang measurement as the output data rather than the estimated bit value from the input signal. This is possible due to the fact that cross talk is pushing the amplitude closer to the decision threshold (or even beyond the decision threshold, which would cause a bit error if no cross talk processing would be used). Therefore, rather than using the signal incident to the receiver, the underlying reason for the eye closure is used to determine the bit. Only if many cross talk coefficients from the aggressor lanes are accumulating, the eye will close. By determining/estimating how much "push" from the aggressor lanes is impacting the victim, it can be determined whether a bit value "0" is pushed upward to the decision threshold (make the bit decision 0) or a bit value 1 was pushed downward to be close to the decision threshold (make bit decision 1).

In one embodiment, there is disclosed a method for cross talk compensation in serial link busses by evaluating if a positive potential or a negative potential is being received by a receiver of a victim from an aggressor is dominant; measuring the distance between an incident signal and a decision threshold to obtain a positive or negative value; and using the positive or negative sign as a recovered bit value.

In another embodiment there is disclosed a system for cross talk compensation in serial link busses by providing evaluating means for determining if a positive potential or a negative potential is being received by a receiver of a victim from an aggressor is dominant; measuring means for determining the distance between an incident signal and a decision threshold to obtain a positive or negative value; and adding means for using the positive or negative sign as a recovered bit value.

In still another embodiment there is disclosed a computer program product for cross talk compensation in serial link busses where said computer program product has a computer readable medium with first program instruction for evaluating if a positive potential or a negative potential is being received by a receiver of a victim from an aggressor is dominant; second program instructions for measuring the distance between an incident signal and a decision threshold to obtain a positive or negative value; and third program instructions for using the positive or negative sign as a recovered bit value.

The foregoing has outlined, rather broadly, the preferred feature of the present invention so that those skilled in the art may better understand the detailed description of the invention that follows. Additional features of the invention will be described hereinafter that form the subject of the claim of the invention. Those skilled in the art should appreciate that they can readily use the conception and specific embodiment as a base for designing or modifying the structures for carrying out the same purposes of the present invention and that such other features do not depart from the spirit and scope of the invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DETAILED DESCRIPTION OF PREFERRED EMBODIMENTS

Embodiments described herein provide methods based on cross talk compensation using simple on-chip elements (either at transmit or receive side). Advantageously, these embodiments do not require the compensation to be in close spatial proximity to the cross talk location ("local compensation") nor do these embodiments require the use of complex on-chip circuitry. The compensation is able to react to most of the cross talk which is generated between two chips such as transmitting and receiving chips ("global compensation") while using only simple on-chip elements. The on-chip elements can be designed such that different levels of cross talk can be addressed by, e.g., programming the chip. Advantageously, the method of the invention employs tight skew control within the electrical bus.

Embodiments of the present invention can take the form of a hardware embodiment or an embodiment including both hardware and software elements. The software can be employed in a form close to the hardware, which persons skilled in the art tend to name firmware or state machine control. In an embodiment, the present invention is implemented in integrated circuits such as on semiconductor chips or printed circuit boards. However, embodiments may include any circuit prone to cross talk.

As referred to herein, cross talk at a receiver chip is the sum of all coupling events, e.g., current, voltage, along a bus. In many applications, the cross talk sums up to one dominant pulse that has similar duration and amplitude when compared to the data signal. Conditions that also contribute to the buildup of a dominant pulse include, e.g., multiple, strong reflections and the associated coupling effects. This one dominant pulse can be compensated, to a large extent, by a simple, on-chip passive element at one specific location. Suggested locations are on-chip, either on the transmitter or the receiver side. This is in contrast to methods which try to counteract each coupling event along the bus and are hence much more costly and complicated to implement. Also, on-chip compensation is adaptable to the specific communication link at hand.

Figure 1:
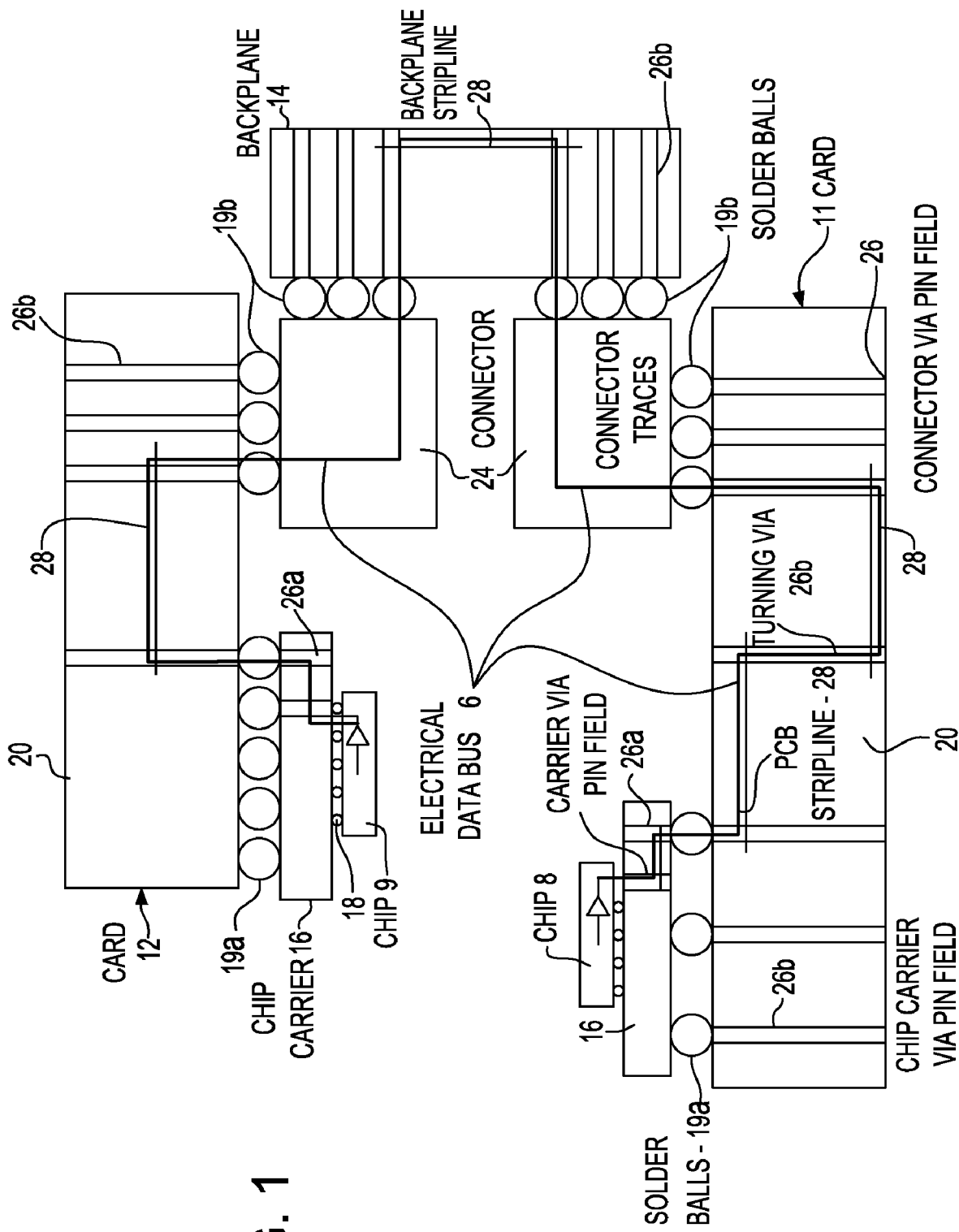
FIG. 1 is a diagram showing of a printed circuit board arrangement with at least one chip including a compensating circuit is accordance with an illustrative embodiment.

Referring now to the drawings in which like numerals represent the same or similar elements and initially to FIG. 1, illustrative elements of a data communication link in, e.g., a server are depicted. An electrical data bus 6 connects a chip 8 on card 11 with chip 9 on card 12 over a back plane 14. The chips 8 and 9 are mounted on chip carriers 16 with solder balls 18, and the chip carriers 16 are in turn mounted on printed circuit boards (PCBs) 20 (e.g., cards 11 and 12) with solder balls 19a. Two connectors 24 join a back plane 14 with the cards 11 and 12 using solder balls 19b. The electrical bus 6, or like conductor element is routed over solder balls 18, package vias 26a, solder balls 19a, through PCB vias 26b and wires (strip lines or other transmission lines) 28 which all affect the electrical performance of the communication link between chips 8 and 9.

Chip 8, chip 9, back plane 14, or PCBs 20 may include a global compensation circuit as will described hereinafter. The global compensation circuit can be included in chip 9 or may be placed in one or more other locations, e.g., chip 8, PFBs etc. The global compensation circuit is preferably integrated into a chip to reduce cross talk for all pieces of the device/circuit. One advantage of the global compensation circuit is that the passive element may be placed in advance without a need to know all of the components in the system and reduces the amount of real estate needed to implement the cross talk compensation on a chip or board.

Figure 2:
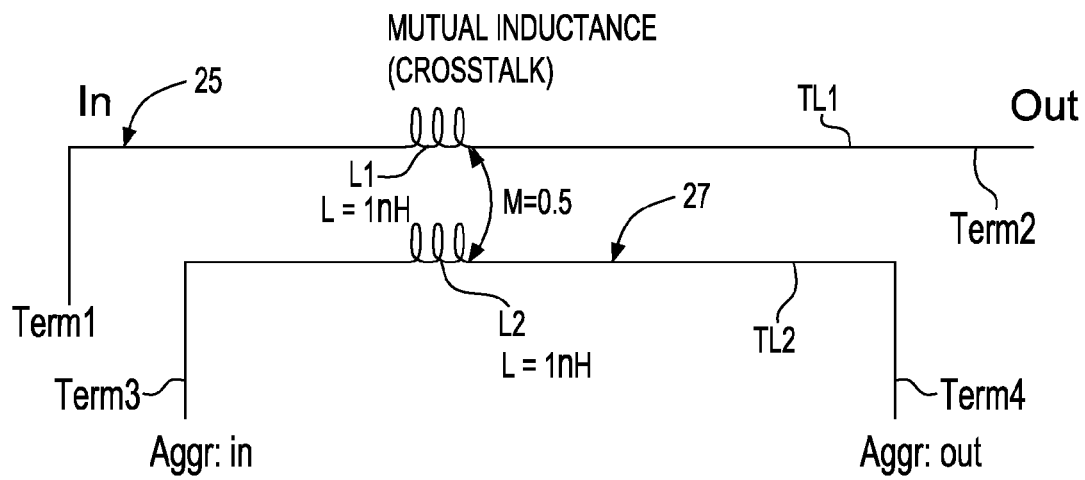
FIG. 2 is a schematic diagram showing an example of mutual inductance cross talk between two communication links.

Referring to FIG. 2, an example of one cross talk aggressor-victim pair for communication links is illustratively shown. The following abbreviations are employed in the Fig.: "Term" is employed for terminations, "TL" for transmission lines and "L" for inductor. Terminations, Term 1 and Term 2 belong to a victim interconnect. A first terminal "In" is linked to a second terminal "Out" via transmission lines TL1. Terminations Term 3 and Term 4 belong to an aggressor interconnect. A second "In", "Out" pair, "Aggr:In" and "Aggr:Out", is routed over transmission lines TL2, and couples to the first pair via a mutual inductance (M). The coupling results in cross talk, i.e. part of "In" signals will be received by "Aggr:Out" (and part of "Aggr:In" signals will be received by "Out"). This, cross talk is detrimental to signal transmission. In this case (as in most cases in practice) the cross talk is inductive (M).

Figure 3:
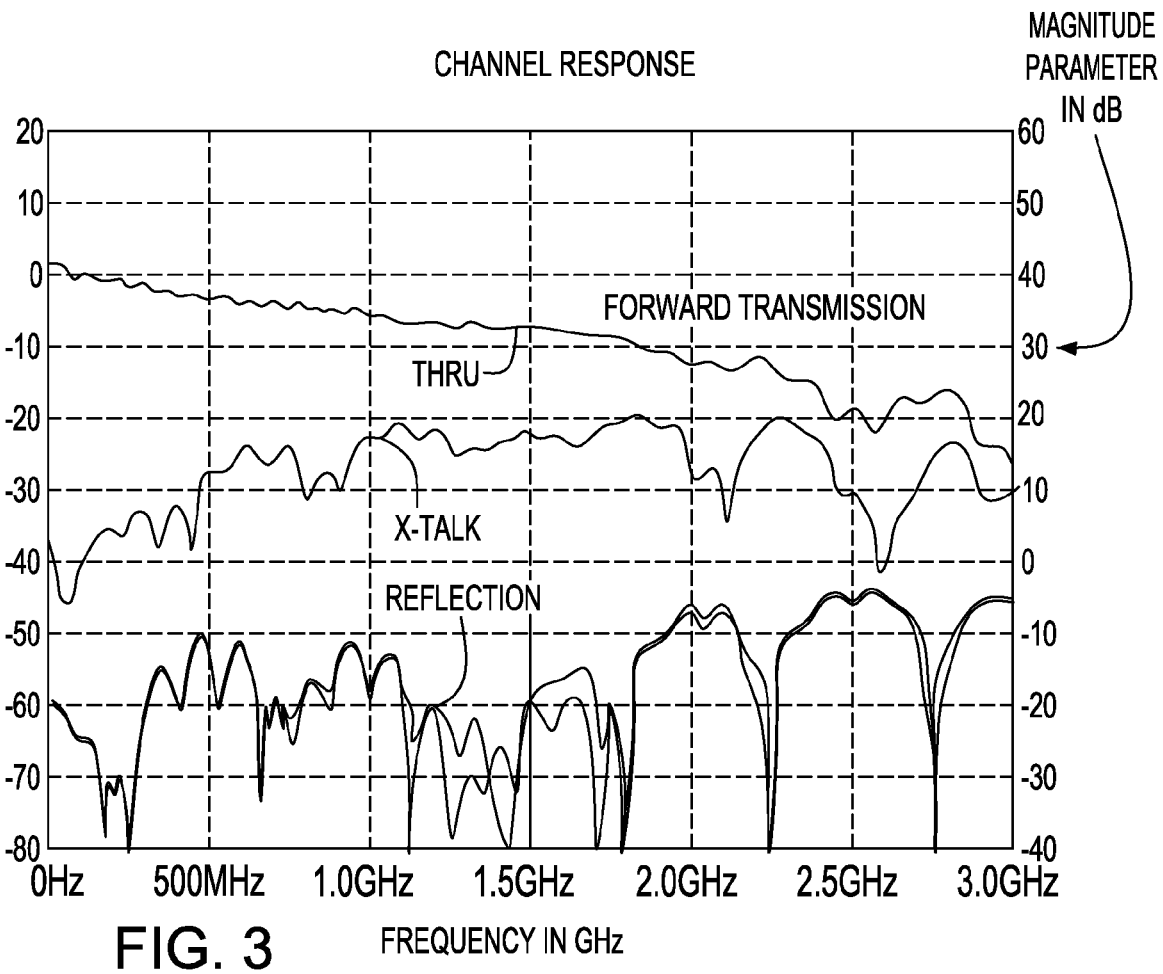
FIG. 3 is a plot showing cross talk magnitude (dB) versus frequency for FIG. 1.

Referring to FIG. 3, there is a plot of "forward thru transmission" relative to "cross talk" and "reflection". The horizontal axis is Frequency in GHz, and the vertical axis is magnitude parameter in dB. FIG. 3 shows that thru forward transmission decreases as the cross talk and reflection increases.

Figure 5:
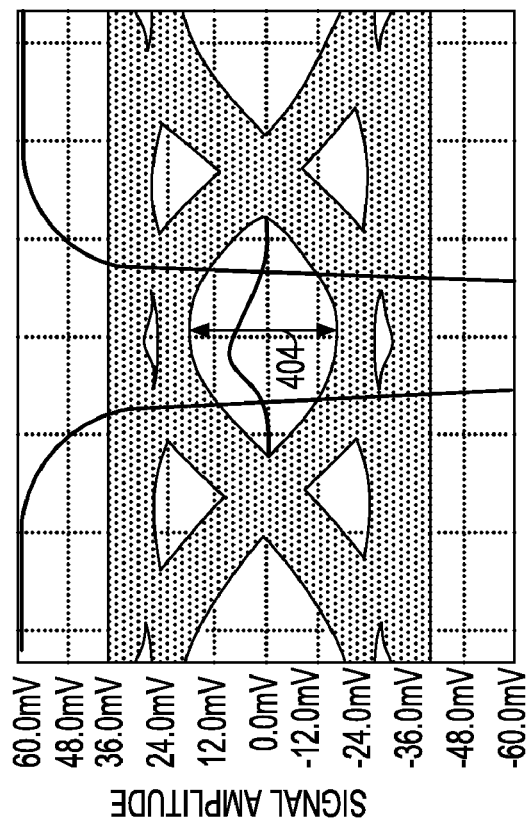
FIG. 5 illustrates an example eye diagram with cross talk.
Figure 4:
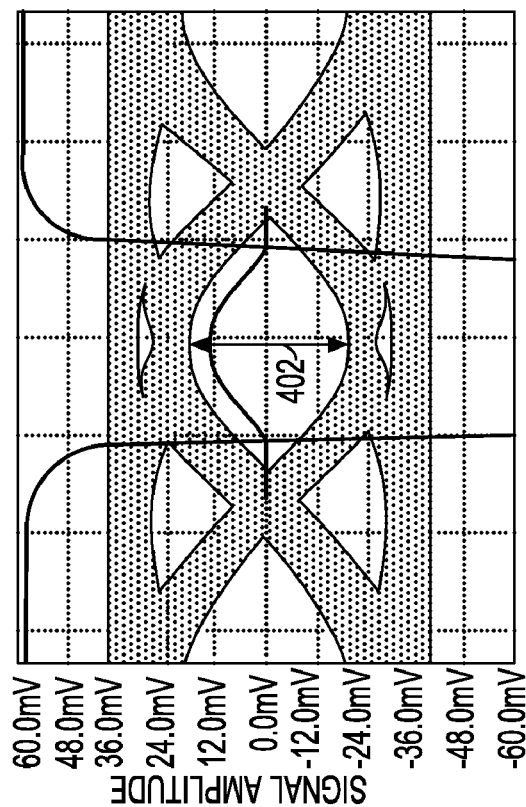
FIG. 4 illustrates an example eye diagram without cross talk.

Referring to the example eye diagrams in FIGS. 4 and 5, there are illustrated examples of two conditions of eye height, one where there is no cross talk (FIG. 4) and the other where there is cross talk (FIG. 5). In FIG. 4, the "1" bit signals and the "0" bit signals in the conductive paths are balanced, i.e., both "1" and "0" bit signals have the same DC component, such that no offset compensation is needed. This results in the eye height 402 of the signals in the two conductive paths being the same for both the "1" and "0" bits in the data stream (eye height). However, FIG. 5 shows a different condition in which the "1" and "0" bit signals in the conductive paths are not balanced and there is a positive offset. In such case, the eye height 404 of the signal is lower on "1" bits than the eye height of the signal for "0" bits. As is disclosed below, this condition can be measured and corrected.

Figure 6:
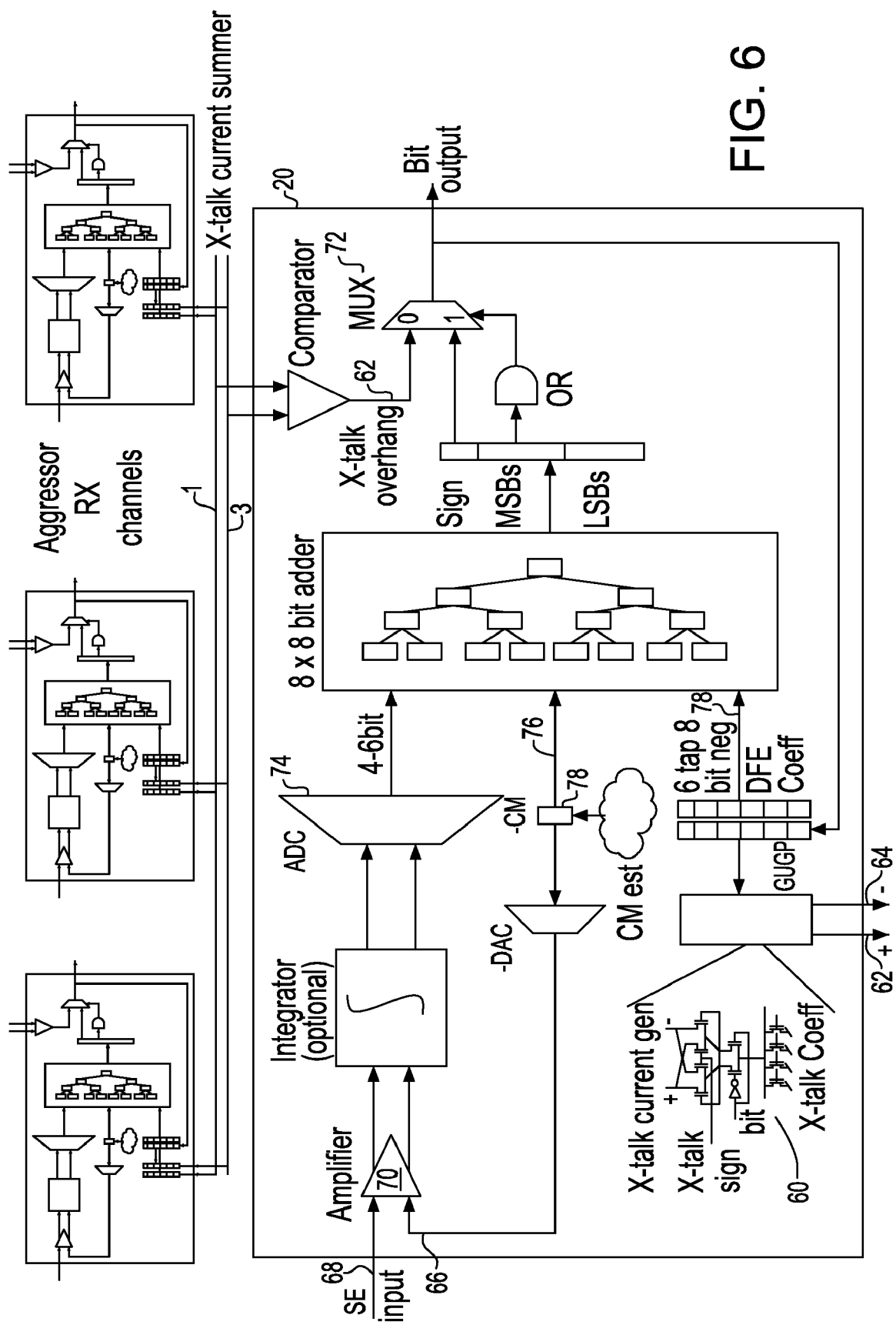
FIG. 6 is a diagram illustrating a cross talk current generator for generating a current that is representing the sum of all cross talk terms in accordance with the principles of the invention.

Referring to FIG. 6, there is shown a diagram illustrating a global compensating circuit which provides offset compensation in accordance with the principles of the invention. In each conductive path 1, 3, a cross talk generator (60) generates a current on terminals 62, 64 that represents the sum of all cross talk terms which impact a victim conductive path based on the previously detected bits in an aggressor path. This sum can be an estimate. The current can be generated by implementing the cross talk current generator (60) using only a hand fill of transistors, which generate a current that has a magnitude proportional to the cross talk pulse. A bit value switch 61 routes this current either to the right or left branch to account for the sign of the aggressor bit, and the cross-talk sign transistors route this current to either the positive or negative terminals 62, 64 to account for the sign of the cross talk pulse. Cross talk currents are generated in the above described manner for a number of the previously detected bits in the aggressor channel, that number being sufficiently high to account for all cross talk pulses. The generated cross talk currents from each aggressor conductive path and each considered aggressor previous bit on conductors 1, 3 can be summed by a simple wired and current summer coupled to conductors 1, 3 to sum all cross talk contributions from all aggressor conductive paths.

In the receiver of the victim, the global compensating circuit 60 determines, whether the positive or negative "push" is dominant. In an embodiment, the receiver determines the distance of the incident data signal from the decision threshold for this purpose. The term distance in this context refers to a voltage difference between the bit voltage incident on terminal 68 and a bit decision voltage threshold. While this threshold can be a predetermined value, e.g., one-half of the signal swing, it is a bit-by-bit estimate derived by accounting decision feedback terms and/or estimates for the common mode signal level in a preferred embodiment. The distance is therefore determined by digitally adding three signal contributions: First, the digital representation at the output of analog to digital converter ADC 74 of the difference between the incident bit signal (e.g. voltage on terminal 68) and an estimated or average value for the common mode voltage level (voltage on terminal 66, generated by a digital to analog converter DAC based on a common mode estimator 18); second, the inverted sum of the product of decision feedback coefficients and previous bit values 78; third, the inverted common mode estimation signal 76. The sum of the latter two estimations 76, 78 can be interpreted as decision threshold. The measurement of the distance between the incident voltage (on terminal 68) and the decision threshold voltage (on terminal 66) is preferably used for cases where the incident bit signal is on a single ended line. In case of differential signaling, the true bit signal would be applied to terminal 68 and the complement bit signal would be applied to terminal 66, thereby replacing the common mode estimator in that case.

A simple window comparator can be used to implement the same function in systems where the decision feedback equalizer (DFE) correction is performed in analog fashion. If the distance between the incident signal and the decision threshold is above a predetermined value, indicating a large difference between the input bit voltage signal 68 and the equivalent threshold voltage formed by the sum of common mode estimation 76 and decision feedback signal 78, the sign of the distance measurement is used as the recovered bit value, as this sign is a digital representation of whether or not the incident signal is above or below the (bit-) decision threshold level.

If the distance between the incident signal and the decision threshold is below a predetermined value, the output of the cross talk overhang comparator 63 is used as the recovered bit value. The cross talk overhang signal 62 is generated by summing all cross talk current outputs 62, 64 as generated in the cross talk current generator 60 on the cross talk current summing conductors 1, 3 which are connected to the input of a comparator circuit that generates a digital value indicating which of the summed currents on conductor 1 or 3 are higher.

The switching between the sign value on conductor 67 or the cross talk overhang signal 62 is done by using a digital multiplexer circuit MUX 72, whose control input is derived from the magnitude of the adder 65 that calculates the distance between the incident signal and the decision threshold by using an OR connection of the relevant most significant bits MSB of the adder output. It is obvious for those skilled in the art that the OR connection of the MSBs correspond to determining whether or not a digital value is larger than a predetermined value.

The circuits as described herein may be part of the design for an integrated circuit chip, chip set or system of printed wiring boards and chips. Chip and/or board designs may be created in a graphical computer programming language, and stored in a computer storage medium (such as a disk, tape, physical hard drive, or virtual hard drive such as in a storage access network). If the designer does not fabricate chips, boards or the photolithographic masks used to fabricate chips and boards, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips or boards can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 7A:
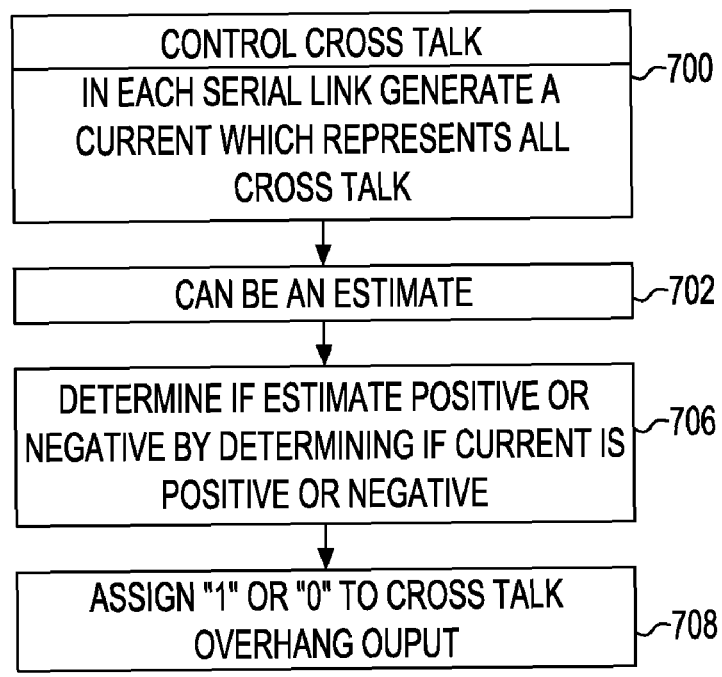
FIGS. 7A and 7B are flow diagrams showing an illustrative method for providing cross talk compensation in accordance with the principles of the invention.
Figure 7B:
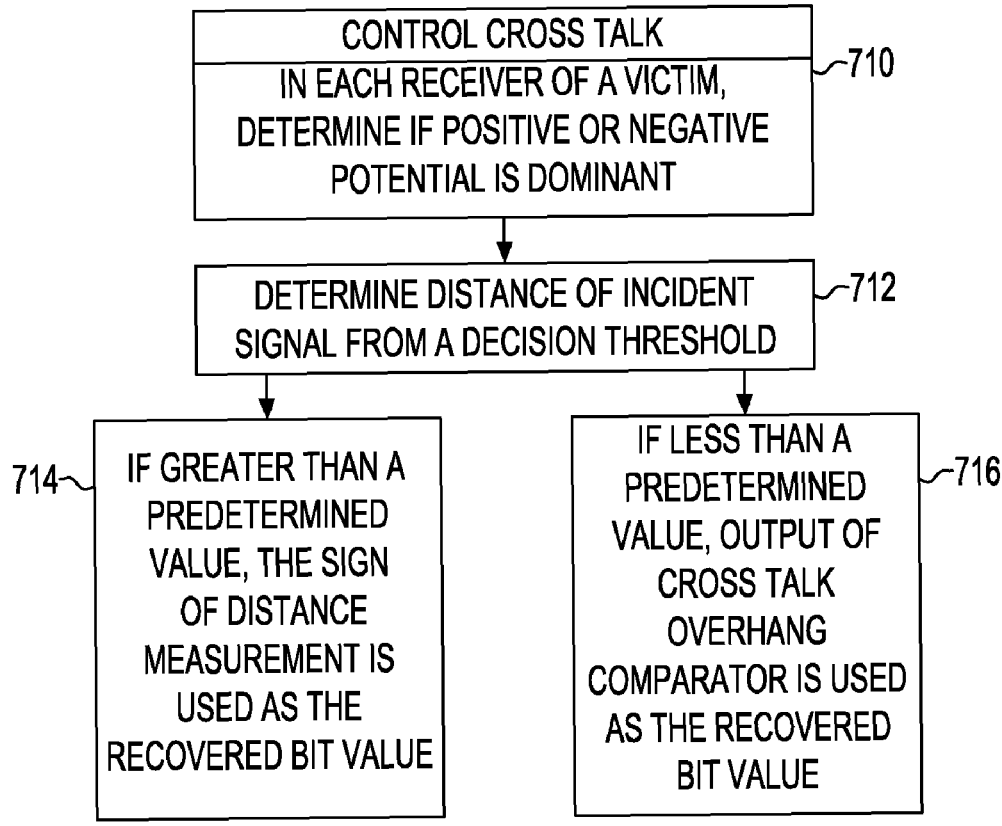

Referring to FIGS. 7A and 7B, a method for cross talk compensation is illustratively presented. In each serial link, block 700, a current is generated which represents the sum of all signed cross talk terms which impact a victim conductive path based on the previously detected bits. This current can be estimated which means that it does not to be an exact representation of all cross talk terms, so that in block 702, this current can be either based on all previously detected bits with high accuracy, or it can be estimated or approximated from analyzing a limited number of previous bits with limited accuracy of the cross talk terms (in the extreme case, just the sign of an aggressor's bit cross talk contribution). In block 706, it is determined whether the current is larger or smaller than zero. In block 708, the cross talk overhang bit (comparator circuit output) is assigned a "1" if the current was determined in block 706 to be positive or equal to zero, or a "0" if negative.

Referring to FIG. 7B, in each receiver of a victim, block 710, it is determined which is dominant, the positive potential or the negative potential of the current bit. Potential in this context refers to the distance between incident bit signal and decision threshold. In block 712, the distance of the potential determined in block 710 from a decision threshold is determined. In block 714, if the distance is greater than a predetermined value, the sign of the distance measurement is used as the recovered bit value. In block 716 if the distance is less than a predetermined value, the output of cross talk overhang comparator as determined as output of block 708 in FIG. 7A is used as the recovered bit value.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software, in particular using firmware, micro code or a state machine implementation of the program. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

As will be appreciate by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program produce embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then complied, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method for cross talk compensation in serial link busses comprising:
   evaluating if a positive potential or a negative potential is being received by a receiver of a victim from an aggressor is dominant;
   measuring the difference between the received signal and a signal having a predetermined value to obtain a positive or negative signal; and
   using the positive or negative signal as a recovered bit value.

2. The method of claim 1 further comprising:
   using the positive or negative signal of the difference measurement when the difference measurement between the received signal and the predetermined signal is greater than a predetermined value.

3. The method of claim 1 further comprising:
   using the positive or negative value of the signal when the difference between the received signal and the predetermined signal is less than a predetermined value.

4. The method of claim 1 where the serial link buses comprises:
   differential or single ended links.

5. The method of claim 3 further comprises:
   determining the difference between the received signal and the predetermined signal by generating a current or a voltage which represents a cross talk coefficient for each aggressive bit received by the victim.

6. The method of claim 5 further comprising:
   estimating or approximating the value of the difference of the current or the voltage of the received signal and the predetermined signal.

7. The method of claim 6 further comprising:
   estimating or approximating the value of the difference of the current or the voltage of the received signal and the predetermined signal by adding a constant current or voltage which is proportional to the value of the cross talk coefficient voltage.

8. The method of claim 5 further comprises:
   determining the sign of the received signal with a comparator or an ADC.

9. The method of claim 5, further comprising:
   determining the sign of the predetermined signal with a comparator or an ADC.

10. A system for cross talk compensation in serial link busses comprising:
    evaluating means for determining if a positive potential or a negative potential is being received by a receiver of a victim from an aggressor is dominant;
    measuring means for determining the difference between the received signal and a signal having a predetermined value to obtain a positive or negative signal; and
    adding means for using the positive or negative signal as a recovered bit value.

11. The system of claim 10 wherein:
    the adding means uses the positive or negative signal of the difference measurement when the difference measurement between the received signal and the predetermined signal is greater than a predetermined value.

12. The system of claim 10 wherein:
    the adding means uses the positive or negative value of the signal when the difference between the received signal and the predetermined signal is less than a predetermined value.

13. The system of claim 10 wherein the serial link buses comprises:
    differential or single ended links.

14. The system of claim 12 further comprising:
    evaluating means for determining the difference between the received signal and the predetermined signal by generating a current or a voltage which represents a cross talk coefficient for each aggressive bit received by the victim.

15. The system of claim 14 further comprising:
    estimating or approximating means for selecting the value of the difference of the current or the voltage of the received signal and the predetermined signal.

16. The system of claim 15 wherein:
    the estimating or approximating means selects the value of the difference of the current or the voltage of the received signal and the predetermined signal by adding a constant current or voltage which is proportional to the value of the cross talk coefficient voltage.

17. The system of claim 14 further comprises:
    selecting means for determining the sign of the received signal and the predetermined signal with a comparator or an ADC.

18. The system of claim 14 further comprises:
    selecting means for determining the sign of the predetermined signal with a comparator or an ADC.

19. A computer program product for cross talk compensation in serial link busses, said computer program product comprising:
    a computer readable medium executable by a processing device, said medium having:
    first program instructions for evaluating if a positive potential or a negative potential is being received by a receiver of a victim from an aggressor is dominant;
    second program instructions for measuring the difference between the received signal and a signal having a predetermined value to obtain a positive or negative signal; and
    third program instructions for using the positive or negative signal as a recovered bit value.

20. The computer program product of claim 19 further comprising:
    fourth program instructions for using the positive or negative signal of the difference measurement when the difference measurement between the received signal and the predetermined signal is greater than a predetermined value.

* * * * *